(12) United States Patent
Oka

(10) Patent No.: US 6,530,599 B1
(45) Date of Patent: Mar. 11, 2003

(54) SHOCK ABSORBING TYPE STEERING SHAFT

(75) Inventor: Shoji Oka, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/285,796

(22) Filed: Apr. 5, 1999

(30) Foreign Application Priority Data

Apr. 24, 1998 (JP) ............................................. 10-115197

(51) Int. Cl.$^7$ ................................................. B62D 1/19
(52) U.S. Cl. ........................... 280/777; 74/492; 188/371
(58) Field of Search ........................... 280/777; 180/78; 74/492, 493; 464/162, 179; 188/371, 374

(56) References Cited

U.S. PATENT DOCUMENTS

| | | | | |
|---|---|---|---|---|
| 3,873,125 A | * | 3/1975 | Bendler et al. | 280/777 |
| 4,667,530 A | * | 5/1987 | Mettler et al. | 74/493 |
| 5,228,720 A | * | 7/1993 | Sato et al. | 280/777 |
| 5,243,874 A | * | 9/1993 | Wolfe et al. | 280/775 |
| 5,342,091 A | | 8/1994 | Hancock | 280/777 |
| 5,575,501 A | * | 11/1996 | Moriyama et al. | 280/777 |
| 5,623,756 A | | 4/1997 | Yanagidate et al. | 29/525 |
| 5,775,187 A | * | 7/1998 | Nikolai et al. | 82/1.11 |
| 5,954,362 A | * | 9/1999 | Aota et al. | 280/777 |
| 6,026,704 A | * | 2/2000 | Shibata et al. | 280/777 X |
| 6,068,296 A | | 5/2000 | Tomaru et al. | 280/777 |
| 6,099,036 A | * | 8/2000 | Fujiu et al. | 280/777 |

FOREIGN PATENT DOCUMENTS

| | | |
|---|---|---|
| JP | 46-965 | 1/1971 |
| JP | 52-3219 | 1/1977 |
| JP | 58-142178 | 9/1983 |
| JP | 58-51096 | 11/1983 |
| JP | 62-143763 | 6/1987 |
| JP | 1-58373 | 4/1989 |
| JP | 5-35542 | 5/1993 |
| JP | 6-8150 | 2/1994 |
| JP | 7-2121 | 1/1995 |
| JP | 8-91230 | 4/1996 |
| JP | 8-91231 | 4/1996 |
| JP | 8-142875 | 6/1996 |

* cited by examiner

Primary Examiner—F. Zeender
(74) Attorney, Agent, or Firm—Miles & Stockbridge P.C.

(57) ABSTRACT

A shock absorbing type steering apparatus comprises in combination, a tubular outer shaft with a female serration on the inner peripheral surface at one end portion thereof and an inner shaft with a male serration engaged with said female serration on the outer peripheral surface at one end portion thereof, the male serration and the female serration being in the state of interference-fitted engagement with each other to be contractable based on a load in the axial direction. A film of solid lubricant is formed on the surface of at least one of the male and female serrations.

11 Claims, 15 Drawing Sheets

SHOCK ABSORBING TYPE STEERING SHAFT

This application claims the benefit of Japanese Application No. 10-115197 which is hereby incorporated by reference.

BACKGROUND OF THE INVENTION

1. Field of the Invention

The present invention relates to improvements in a shock absorbing type steering shaft of an automobile which is utilized to transmit the movement of a steering wheel to a steering gear, and to regulate a load required for contracting the total length of the steering shaft during a collision accident to protect the driver.

2. Related Background Art

In a steering apparatus for an automobile, a steering mechanism as shown in FIG. 6 is used to transmit the movement of a steering wheel to a steering gear. The first steering shaft 2 having a steering wheel 1 fixed to the upper end portion thereof is rotatably inserted in a steering column 3. This steering column 3 is fixed to the lower surface of an instrument panel 6 by upper and lower brackets 4, 5. The upper end portion of a second steering shaft 8 is connected through a first universal joint 7 to a lower end portion of the first steering shaft 2 which protrudes from the lower end opening of the steering column 3. Further, the lower end portion of this second steering shaft is connected through a second universal joint 9 to a third steering shaft 10 leading to a steering gear (not shown), In the steering mechanism thus constructed, the movement of the steering wheel 1 is transmitted to the steering gear through the first steering shaft 2 inserted through the steering column 3, the first universal joint 7, the second steering shaft 8, the second universal joint 9, and the third steering shaft 10 to give a steering angle to wheels.

In the steering mechanism thus constructed, the steering column 3 and the steering shafts 2, 8 are usually made into a shock absorbing type in which the total length shortens due to a shock in order to protect a driver during collision. The structure described in U.S. Pat. No. 5,623,756 is known as such a shock absorbing type steering shaft. FIGS. 7 to 13 show the shock absorbing type steering shaft described in this the United States patent, while FIGS. 14 to 18 a method of manufacturing the shock absorbing type steering shaft which is also described in this United States patent, respectively.

This shock absorbing type steering shaft 11 is constructed such that an outer shaft 12 and an inner shaft 13 are combined for relative displacement in an axial direction (the left to right direction as viewed in FIG. 7), whereby the total length of the shaft shortens when an impact force in the axial direction is applied. The outer shaft 12 as a whole is of a tubular shape and one end portion (the left end portion of the steering shaft 11 as viewed in FIG. 7) thereof is subjected to drawing, whereby a small-diametered portion 14 is formed in this end portion. A female serration 15 is formed on the inner peripheral surface of this small-diametered portion 14. The inner shaft 13 as a whole is also of a tubular shape and one end portion (the right end portion as viewed in FIGS. 7 and 8) thereof is widened to thereby form a large-diametered portion 16. A male serration 17 is formed on the outer peripheral surface of this large-diametered portion 16 to be engaged with the female serration 15.

Also, the fore end portion (the right end portion as viewed in FIGS. 7 and 8) of the large-diametered portion 16 is squeezed a little in the diametral direction thereof, whereby a first deformed portion 18 of an elliptical cross-sectional shape is formed over a length L. The major axis d1 of this first deformed portion 18 is larger than the diameter d0 of the body portion of the large-diametered portion 16, and the minor axis d2 of the first deformed portion is smaller than this diameter d0 (d1>d0>d2). Note that the diameters of the large-diametered portion 16 on which the male serration 17 is formed are all represented by the diameter (pcd) of that portion of the serration which corresponds to a pitch circle.

On the other hand, the fore end portion (the left end portion as viewed in FIGS. 7 and 11) of the small-diametered portion 14 is also squeezed a little in the diametral direction thereof, whereby a second deformed portion 19 of an elliptical cross-sectional shape is formed over the length L. The major axis D1 of this first deformed portion 19 is larger than the diameter D0 of the body portion of the small-diametered portion 14, and the minor axis D2 of the second deformed portion 19 is smaller than this diameter D0 (D1>D0>D2). The diameters of the small-diametered portion 14 on which the female serration 15 is formed are also all represented by the diameter (pcd) of that portion of the serration which corresponds to a pitch circle.

The diameter D0 of the small-diametered portion 14 is made slightly larger than the diameter d0 of the large-diametered portion 16 (D0>d0) so that the female serration 15 and the male serration 17 may be brought into loose engagement with each other in portions other than the first and second deformed portions 18 and 19. However, the major axis d1 of the first deformed portion 18 is made slightly larger than the diameter D0 of the body portion of the small-diametered portion 14 (d1>D0) and the minor axis D2 of the second deformed portion 19 is made slightly smaller than the diameter d0 of the body portion of the large-diametered portion 16 (D2<d0).

The outer shaft 12 and the inner shaft 13 having such shapes as described above are combined together as shown in FIG. 7 to thereby provide the shock absorbing type steering shaft 11. More specifically, the large-diametered portion 16 formed on one end portion of the inner shaft 13 is located inside the small-diametered portion 14 formed on one end portion of the outer shaft 12, and the female serration 15 on the inner peripheral surface of the small-diametered portion 14 and the male serration 17 on the outer peripheral surface of the large-diametered portion 16 are brought into engagement with each other. In this state, the first deformed portion 18 formed on the fore end portion of the large-diametered portion 16 is pushed into a base end portion (the right end portion as viewed in FIGS. 7 and 11) of the small-diametered portion 14 while being elastically deformed (or plastically deformed). Also, the second deformed portion 19 formed on the fore end portion of the small-diametered portion 14 is pushed into a base end portion (the left end portion as viewed in FIGS. 7 and 8) of the large-diametered portion 16 while also being elastically deformed (or plastically deformed).

Accordingly, in the state in which the outer shaft 12 and the inner shaft 13 are combined together as shown in FIG. 7, the outer peripheral surface of the first deformed portion 18 is frictionally engaged with the inner peripheral portion of the base end portion of the small-diametered portion 14, and the inner peripheral surface of the second deformed portion 19 is frictionally engaged with the outer peripheral portion of the base end portion of the large-diametered portion 16, respectively. As a result, the outer shaft 12 and the inner shaft 13 are coupled together for the transmission of a rotational force between the two shafts 12 and 13, but against relative displacement in the axial direction so long as a strong force is not applied.

As described, the coupling between the outer shaft 12 and the inner shaft 13 is effected by bringing the first and second deformed portions 18 and 19 formed on the metallic outer shaft 12 and the inner shaft 13 into pressure-fitting to partner members and therefore, the heat resisting property of the coupling portion becomes sufficient and it never happens that the supporting force of the coupling portion becomes deficient depending on use conditions. Also, the first and second deformed portions 18 and 19 are provided at two axially spaced locations in the coupling portion between the outer shaft 12 and the inner shaft 13 and therefore, the bending rigidity of the coupling portion between the outer shaft 12 and the inner shaft 13 is also sufficiently secured.

Further, when a strong force is applied in the axial direction during collision, the outer shaft 12 and the inner shaft 13 are displaced relative to each other in the axial direction against a frictional force which is exerted on the pressure-fitted portions by the first and second deformed portions 18 and 19, to thereby shorten the total length of the shock absorbing type steering shaft 11. In the case of such a shock absorbing type steering shaft 11, the force required to shorten the total length suffices if it overcomes the frictional force exerted on the above-described two pressure-fitted portions. Accordingly, a contraction load (a collapse load) required to shorten the total length of the shock absorbing type steering shaft 11 is stable without becoming great, thereby effectively preventing a great impact force from being applied to a driver's body which has collided against the steering wheel in case of a collision accident.

When the outer shaft 12 and the inner shaft 13 are to be combined together to thereby construct such a shock absorbing type steering shaft 11 as shown in FIG. 7, the two shafts 12 and 13 are first combined together as shown in FIG. 14. More specifically, the female serration 15 and the male serration 17 are brought into engagement with each other by the fore end portion of the small-diametered 20 portion 14 and the fore end portion of the large-diametered portion 16. Then, with these serrations 15 and 17 kept in engagement with each other, the outer peripheral surface of the small-diametered portion 14 is pressed inwardly in the diametral direction thereof. That is, a pair of pressing pieces 20 and 20 are disposed around the fore end portion of the small-diametered portion 14 and the fore end portion of the large-diametered portion 16, and the pair of pressing pieces 20 and 20 are brought close to each other to thereby press the outer peripheral surface of the small-diametered portion 14 strongly. The inner side surfaces of these pressing pieces 20 and 20 which bear against the outer peripheral surface of the small-diametered portion 14 are provided with recesses 21 and 21 of an arcuate cross-sectional shape which are in close contact with this outer peripheral surface, as shown in FIG. 15.

Gaps 22 and 22 having a thickness dimension δ are formed between the end surfaces of the pair of pressing pieces 20 and 20 with the recesses 21 and 21 brought into light contact with the outer peripheral surface of the small-diametered portion 14. Also, these pressing pieces 20 and 20 are strongly pressed toward each other by a pressing device, not shown, such as a hydraulic mechanism. So, if as shown in FIG. 16, the pair of pressing pieces 20 and 20 are moved toward each other until the thickness of the gaps 22 and 22 becomes zero, the cross-sectional shape of the fore end portion of the small-diametered portion 14 will be plastically deformed into an elliptical shape, as shown in FIG. 16. Further, the fore end portion of the large-diametered portion 16 which is inserted in the fore end portion of this small-diametered portion 14 is also pushed in the same direction through the two serrations 15 and 17. Then, the cross-sectional shape of the fore end portion of this large-diametered portion is also plastically deformed into an elliptical shape, as shown in FIG. 16.

In this manner, the fore end portion of the small-diametered portion 14 and the fore end portion of the large-diametered portion 16 are pressed inwardly in the diametral direction thereof and the cross-sectional shapes of these two fore end portions are plastically deformed into an elliptical shape, whereafter the outer shaft 12 and the inner shaft 13 are displaced relative to each other toward each other in the axial direction. That is, after these two shafts 12 and 13 have been taken out of the pair of pressing pieces 20 and 20, the outer shaft 12 is displaced leftward as viewed in FIG. 14 relative to the inner shaft 13 while the inner shaft 13 is displaced rightwardly as viewed in FIG. 14 relative to the outer shaft 12. Then, as shown in FIG. 7, the fore end portion of the small-diametered portion 14 is pressure-fitted into the base end portion of the large-diametered portion 16, while the fore end portion of the large-diametered portion 16 is pressure-fitted into the base end portion of the small-diametered portion 14. The intermediate portion of the small-diametered portion 14 and the intermediate portion of the large-diametered portion 16 which are not plastically deformed by the pressing pieces 20 and 20 are brought into loose engagement with each other.

In the case of the structure described in the above-mentioned U.S. Pat. No. 5,623,756, as shown in FIG. 17, the inner surfaces of pressing pieces 20a and 20a for plastically deforming the fore end portions (see FIG. 14) of the small-diametered portion and the large-diametered portion which are engaged with each other are not formed with the recesses 21 and 21 (FIGS. 15 and 16), but are made into simple flat surfaces. Or, as shown in FIG. 18, a pair of pressing pieces 20b and 20b are formed into a V block shape so that the pressing pieces 20b and 20b press the fore end portions (see FIG. 14) of the small-diametered portion 14 and the large-diametered portion 16 which are engaged with each other at two locations each, i.e., four locations in total.

DESCRIPTION OF THE PRIOR INVENTION

Further, in the prior application U.S. Ser. No. 08/960,209, now U.S. Pat No. 6,068,296, there is disclosed an invention related to a method of adjusting a contraction load required for contracting a shock absorbing type steering shaft 11 to a desired value. FIGS. 19 to 22 show an example of this adjusting method of the prior invention.

In order to carry out the method of adjusting a contraction load of a shock absorbing type steering according to the prior invention, a female serration 15 and a male serration 17 formed, respectively on the peripheral surfaces of the shafts 12 and 13 are first brought into engagement with each other at a fore end portion (the left end portion as viewed in FIGS. 19, 21 and 22) which is one end portion of the outer column member shaft 12 and a rear end portion (the right end portion as viewed in FIGS. 19, 21 and 22) which is one end portion of the inner column member or shaft 13, as shown in FIG. 19. In the state in which these both serrations 15 and 17 are engaged with each other, the outer peripheral surface of the outer column member or shaft 12 is pressed inwardly in the diametral direction thereof by a pair of pressing pieces 20a' and 20a' which are displaced toward each other, as shown in FIGS. 19 and 20. Thus, the fore end portion of the outer shaft 12 and the rear end portion of the inner column member shaft 13 are pressed in the diametral direction by the pressing pieces 20a' and 20a' so that the cross sections of these both end portions are plastically deformed into the respective elliptical shapes. The elliptical shapes are as shown above in FIG. 16, although the pressing pieces 20a' and 20a' used differ from ones shown in FIG. 16.

Particularly, for the method of adjusting a contraction load of a shock absorbing type steering shaft of the prior invention, a pair of pressing pieces in which the pressing surfaces 23 and 23 are flat and parallel to each other are used as the above-mentioned pair of pressing pieces 20a' and 20a'. While these both pressing surfaces 23 and 23 are kept to be parallel to each other, the above-mentioned pair of pressing pieces 20a' and 20a' are brought close to each other.

If the cross sections of the fore end portion of the outer shaft 12 and the rear end portion of the inner shaft 13 are thus deformed into the respective elliptical shapes by the pair of pressing pieces 20a' and 20a', the outer shaft 12 and the inner shaft 13 are urged to displace toward each other. Then, as shown in FIG. 21, the fore end portion of the outer shaft 12 and the rear end portion of the inner shaft 13 are laid to overlap each other only by a desired length L in the axial direction. This desired length L is a normal fitting length by which the above-mentioned outer shaft 12 and inner shaft 13 are fitted to each other in a normal state (a state in which no collision accident has occurred). At a secondary collision, as shown in FIG. 22, a fitting length between the outer shaft 12 and the inner shaft 13 is larger than the above-mentioned normal fitting length L so that the total length of the above-mentioned shock absorbing type steering shaft 11 is shortened. In the case of the method of adjusting a contraction load of a shock absorbing type steering shaft of the prior invention, a pressing load for bringing the above-mentioned pair of pressing 20a' and 20a' close to each other is changed in order to regulate the contraction load for contracting the total length of the above-mentioned shock absorbing type steering shaft 11 into a desirable value.

More specifically, when a pair of pressing pieces whose pressing surfaces 23 and 23 are flat and parallel to each other are used as the pair of pressing pieces 20a' and 20a' and these pressing pieces 20a' and 20a' are brought close to each other while the both pressing surfaces 23 and 23 are kept to be parallel to each other, the relation between the pressing load for bringing the both pressing pieces 20a' and 20a' close to each other and the above-mentioned contraction load is as shown in FIG. 23. As clearly shown in FIG. 23, the pressing load and the contraction load are substantially proportional to each other. Accordingly, it is possible to regulate the contraction load into a desirable value by adjusting the pressing load. Note that the contraction load shown in FIG. 23 is a load required for starting contraction of the shock absorbing type steering shaft 11 which has the outer shaft 12 and the inner shaft 13 fitted to each other only by the above-mentioned normal fitting length L, so as to lengthen the fitting length of the shafts 12 and 13.

As described above, when an engaged portion between the outer shaft 12 and the inner shaft 13 was plastically deformed by the pressing pieces 20a' and 20a' having the pair of flat surfaces 23 and 23 parallel to each other as the pressing surfaces thereof, the pressing load and the contraction load were substantially proportional to each other. Contrarily, when the pressing pieces 20 and 20 having the recesses 21 and 21 of an arcuate shape as shown in FIGS. 15 and 16 or the pressing pieces 20b and 20b of a V block shape as shown in FIG. 18 were used, the pressing load and the contraction load were hardly proportional to each other so that it is difficult to adjust the contraction load by the pressing load.

According to the prior invention as described above, a load required for contracting a shock absorbing type steering shaft 11 is regulated into a desirable value so as to realize a steering device which can effectively protect the driver at a secondary collision. Moreover, the bending rigidity of the fitted portion between the outer shaft 12 and the inner shaft 13 when the two shafts are fitted into each other only by the above-mentioned normal fitting length L is higher (larger) so as to prevent this fitted portion from being shaky in normal condition.

As described above, in the shock absorbing type steering shaft 11 for which the prior invention is conceived, after the cross-sectional shapes of the end portion of the outer shaft 12 and the end portion of the inner shaft 13 are plastically deformed in the state in which the end portion of the outer shaft 12 and the end portion of the inner shaft 13 are brought into engagement with each other as shown in FIG. 19 (or FIG. 14), these both shafts 12 and 13 are displaced toward each other as shown in FIG. 21 (or FIG. 7). For this reason, these both shafts 12 and 13 are strongly fitted to each other at two locations which are separated away in the axial direction, as seen in FIG. 7, and the fitting strength at an intermediate portion between the two locations becomes very weak. Accordingly, in order to strengthen the bending rigidity of the fitted portion between the both shafts 12 and 13, it is required to strengthen the fitting strength at these two locations. Since these fitted portions at the two locations are formed by keeping a first deformed portion 18 and a second deformed portion 19 which have been simultaneously plastically deformed away from each other in the axial direction (as shown in FIG. 7), the fitting strength is required to be the same at the above-mentioned two locations in order to strengthen the fitting strength at each of the two locations.

From this point of view a result of experiments to know the degree of an influence of the difference in shape among the pressing pieces 20, 20a and 20b mentioned above on the fitting strength of the fitted portion of the shock absorbing type steering shaft 11 is shown in FIG. 24. That is, when the engaged portion between the outer shaft 12 and the inner shaft 13 is plastically deformed by the pressing pieces 20a' and 20a' whose the pressing surfaces 23 and 23 are flat and parallel to each other, the relation between an amount of contraction and a contraction load of the shock absorbing type steering shaft 11 is as shown in FIG. 24. In FIG. 24, the amount of contraction is plotted along the abscissa and the contraction load is plotted along the ordinate, respectively. The position zero of the abscissa indicates the position of state in which the outer shaft 12 and the inner shaft 13 are separated away from each other while the engaged portion between the outer shaft 12 and the inner shaft 13 remains plastically deformed, as shown in FIG. 19 (or FIG. 14). Also, the position of the normal fitting length L on the abscissa indicates the position of state in which the both shafts 12 and 13 are fitted to each other in a normal use condition, as shown in FIG. 21.

Further, the position of the point P on the abscissa indicates the position of state in which the above-mentioned shock absorbing type steering shaft 11 has been contracted due to such a contraction load as generated during a collision accident so that the first deformed portion 18 formed on the one end portion of the inner shaft 13 has been taken out from the female serration 15 of the outer shaft 12, as shown in FIG. 22. In this state indicated by the position of the point P, the contraction load required for contracting the shock absorbing type steering shaft 11 only includes a force for resisting the fitted portion between the second deformed portion 19 formed on the one end portion of the outer shaft 12 and the male serration 17 on the outer peripheral surface of the inner shaft 13. Accordingly, if the contraction load α at this point P is about a half the contraction load at the above-mentioned normal fitting length L position, the fitting strength will be substantially equal at the above-mentioned two locations. According to the experiments mentioned above, it was found that the contraction load α at the position P is substantially equal to the contraction load β which has been decreased from the normal fitting length L to the position P (α=β) and the fitting strength is substantially the same at the above-mentioned two locations.

On the other hand, when the pressing pieces 20 and 20 which have the arcuate recesses 21 and 21 as shown in FIGS. 15 and 16 or the pressing pieces 20b and 20b in a V block shape as shown in FIG. 18 were used to form the shock absorbing type steering shaft 11, a contraction load α' at a portion corresponding to the position of the point P and a contraction load β' which had been decreased during a portion from a portion corresponding to the normal fitting length L to a portion corresponding to the position of the point P were largely different from each other as shown in FIG. 25. Such a large difference between the both loads α' and β' as mentioned above means that the fitting strength of the fitted portion between the outer shaft 12 and the inner shaft 13 is small.

The structure disclosed in U.S. Pat. No. 5,623,756 and the structure and the method disclosed in the prior invention of U.S. Ser. No. 08/960,209 are superior in securing the bending rigidity of a shock absorbing the steering shaft and stabilizing a contraction load thereof, as compared to the conventional structure and method. However, in order to stabilize this contraction load more, there is still a room for improvement.

More specifically, in case of a shock absorbing type steering shaft to which the present invention is to be applied, a female serration is formed on an end portion of the inner peripheral surface of the outer shaft, while a male serration is formed on an end portion of the outer peripheral surface of the inner shaft, respectively. Out of these serrations, the female is formed by broaching, while the male serration is formed by rolling. When these serrations are formed by such processings, it is difficult to obtain uniform surface roughness for these serrations. Indeed, the surface roughness of these serrations fluctuates unavoidably.

Such fluctuation in surface roughness of the serrations directly leads to fluctuation in a contraction load of the shock absorbing type steering shaft. That is, when the surface roughness is large (rough), the contraction load becomes large, while when the surface roughness is small (smooth), the contraction load becomes small. If the contraction fluctuates because of such reason, it becomes difficult to design a steering apparatus for protecting the driver. In order to suppress fluctuation in the surface roughness of the serrations to stabilize the contraction load, a finishing process such as liquid honing may be performed which, however, is not practical because of the increased processing cost therefor.

SUMMARY OF THE INVENTION

Considering such circumstances, an object of the present invention is to provide a shock absorbing type steering shaft which is capable of obtaining a stable contraction load and is manufactured at a low cost.

A shock absorbing type steering shaft of the present invention comprises, in combination, a tubular outer shaft which is formed with a female serration on the inner peripheral surface at one end thereof, and an inner shaft which is formed with a male serration on the outer peripheral surface at one end thereof, the male serration and the female serration being in the state of interference-fitted engagement to be contractable based on a load in the axial direction.

Particularly, an improvement of the shock absorbing type steering shaft of the present invention resides in that a film of solid lubricant is formed at least on one surface of the male serration and the female serration.

In case of the shock absorbing type steering shaft of the present invention having the above-mentioned structure, the female serration formed on the inner peripheral surface at one end of the outer shaft and the male serration formed on the outer peripheral surface at one end of the inner shaft are brought into slidable contact through the film of solid lubricant. There is no possibility or little possibility, if any, of direct contact between the metal for forming the outer shaft and that for forming the inner shaft. Consequently, a sliding state between the female serration and the male serration is stabilized and a contraction load of the above-mentioned shock absorbing type steering shaft is stabilized.

DETAILED DESCRIPTION OF THE PREFERRED EMBODIMENTS

Figure 1:
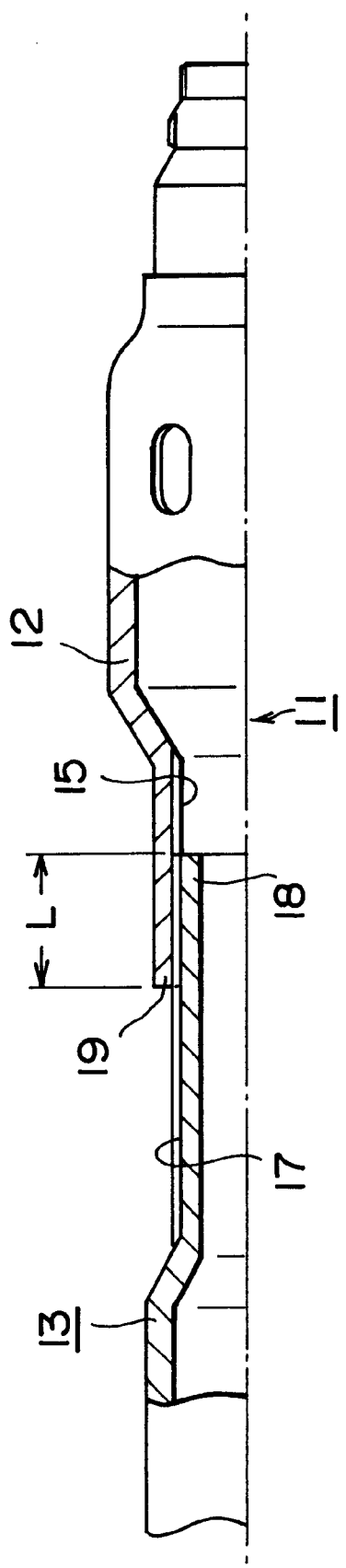
FIG. 1 is a partial cross-sectional view for showing an embodiment of the present invention.
Figure 2:
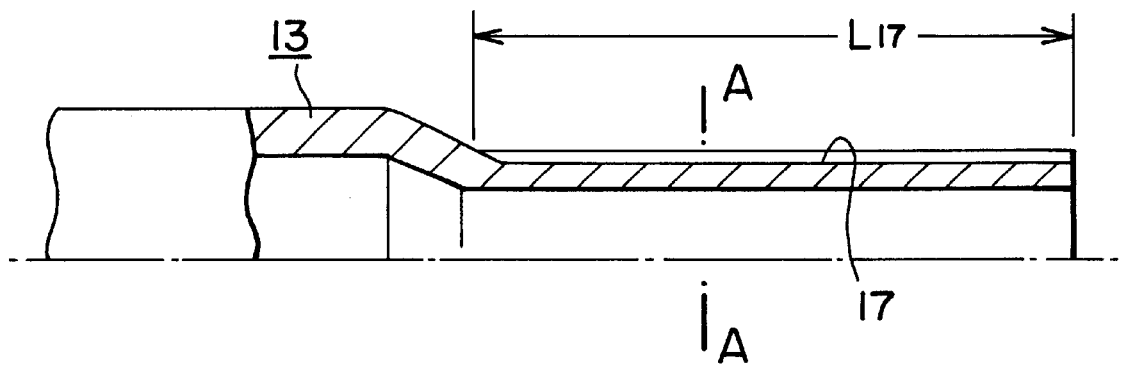
FIG. 2 is a partial cross-sectional view for showing an inner shaft taken out.
Figure 3:
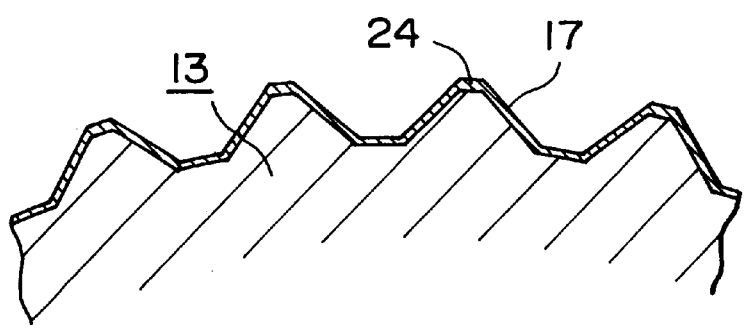
FIG. 3 is a cross-sectional view taken along the line A—A of FIG. 2 in an enlarged manner.
Figure 6:
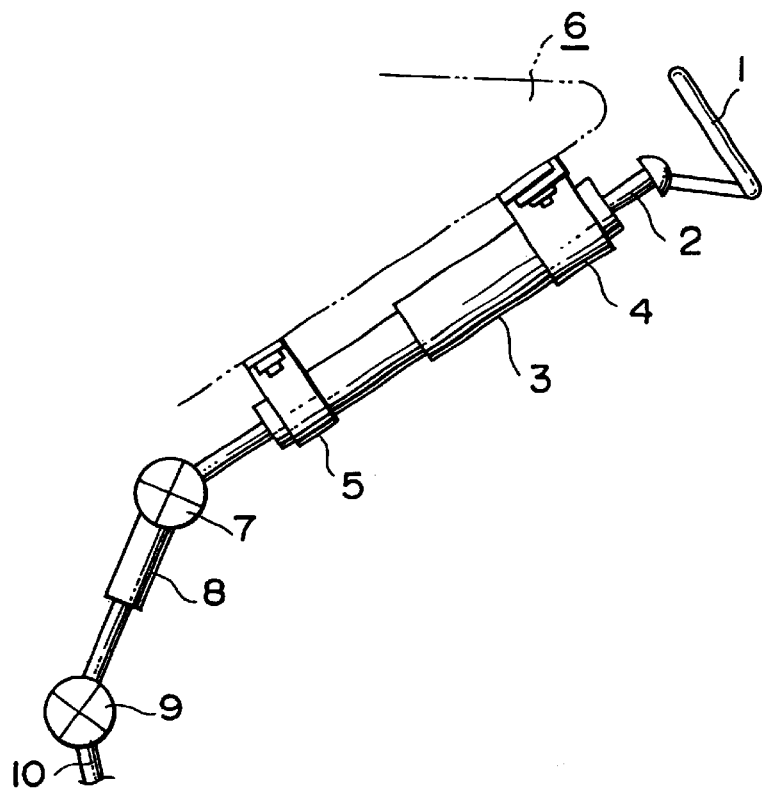
FIG. 6 is a side view for showing an example of the steering mechanism having a shock absorbing type steering shaft to which the present invention is to be applied incorporated therein.

FIGS. 1 to 3 show one embodiment of the present invention. A shock absorbing type steering shaft 11 of the present invention is corresponding to the shaft 8 in FIG. 6. This steering shaft is formed, as shown in FIG. 1, by bringing a female serration 15 and a male serration 17 formed, respectively, on the peripheral surfaces of shafts 12 and 13 into engagement with each other at a fore end portion of the outer shaft 12 (the left end portion as viewed in FIG. 1) which is one end portion of the outer shaft 12 and a rear end portion of the inner shaft 13 (the right end portion as viewed in FIG. 1) which is one end portion of the inner shaft 13.

Figure 7:
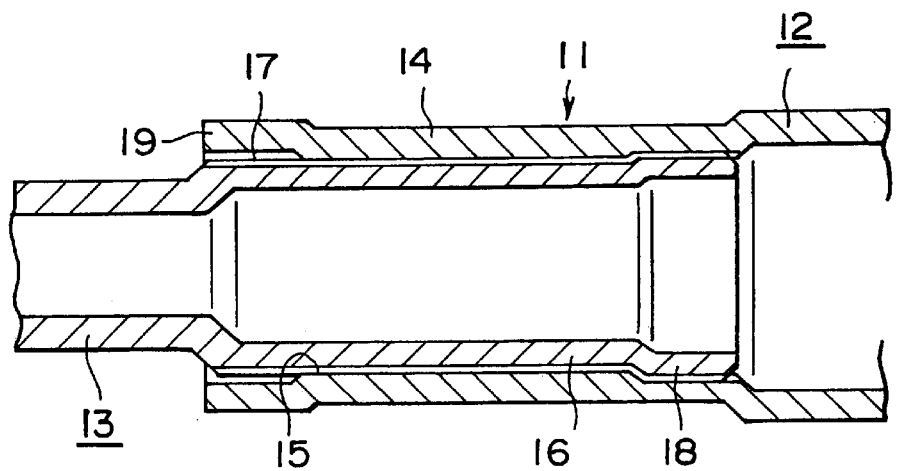
FIG. 7 is a cross-sectional view for showing principal portions of a prior art structure.
Figure 8:
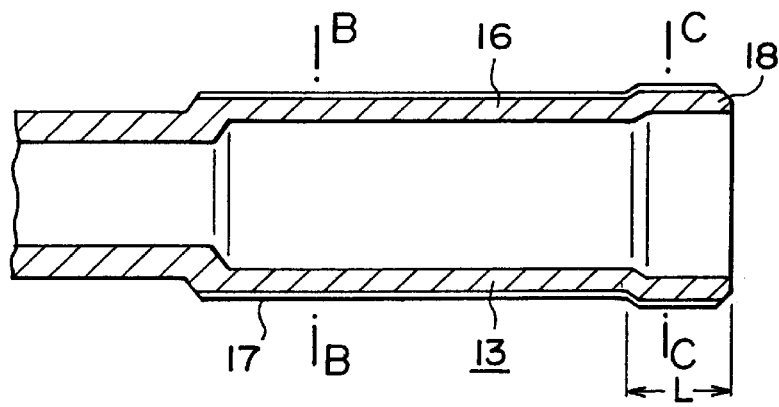
FIG. 8 is a cross-sectional view for showing an inner shaft to be incorporated in the prior art structure.
Figure 9:
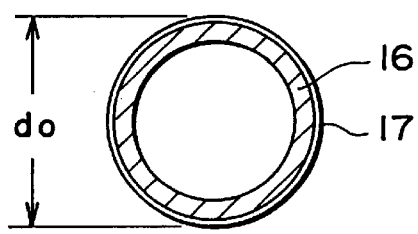
FIG. 9 is a cross-sectional view taken along the line B—B line of FIG. 8.
Figure 10:
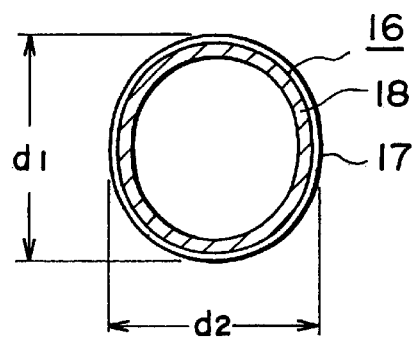
FIG. 10 is a cross-sectional view taken along the line C—C line of FIG. 8.
Figure 11:
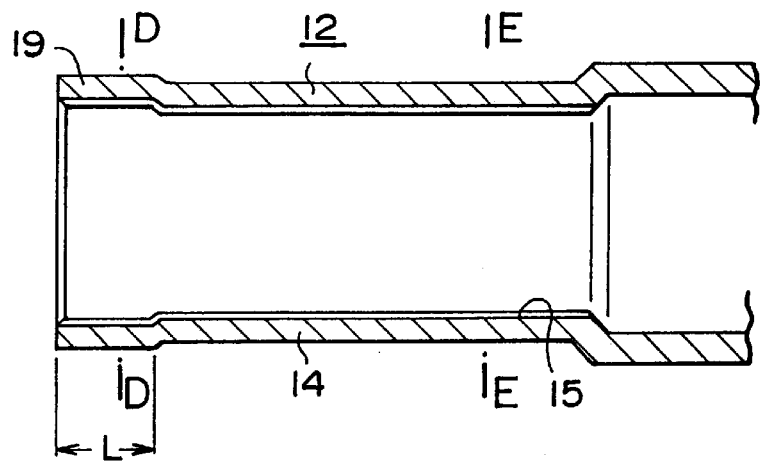
FIG. 11 is a cross-sectional view for showing an outer shaft to be incorporated in the prior art structure.
Figure 12:
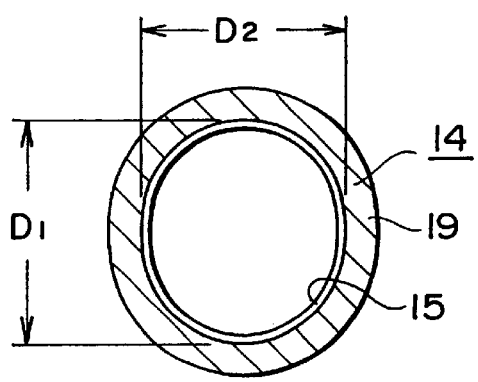
FIG. 12 is a cross-sectional view taken along the line D—D line of FIG. 11.
Figure 13:
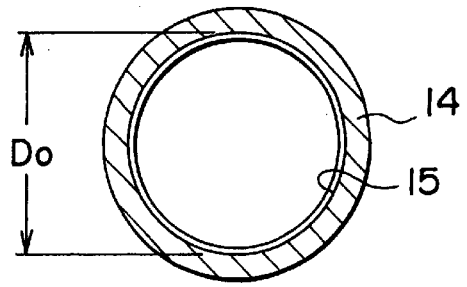
FIG. 13 is a cross-sectional view taken along the line E—E line of FIG. 11.
Figure 14:
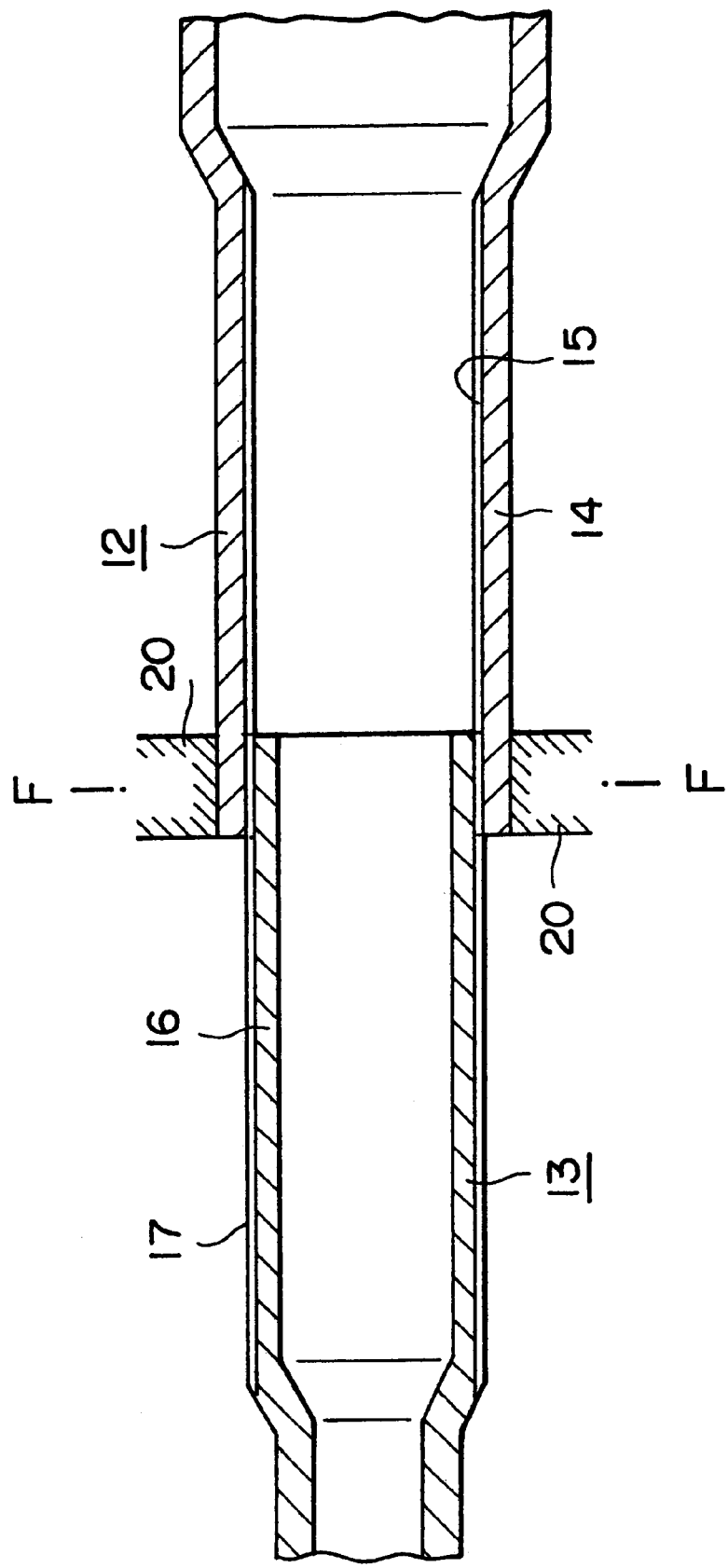
FIG. 14 is a cross-sectional view of principal portions for showing a step of a first known method of manufacturing a shock absorbing type steering shaft.
Figure 15:
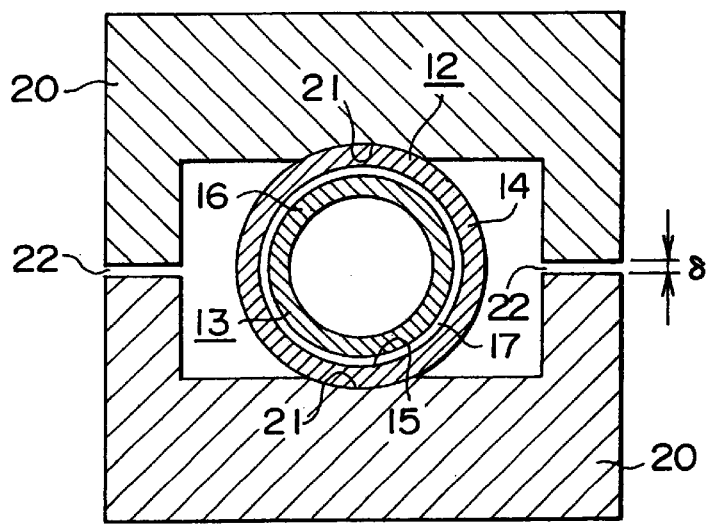
FIG. 15 is a cross-sectional view taken along the line F—F of FIG. 14 in a state before plastic deformation.
Figure 16:
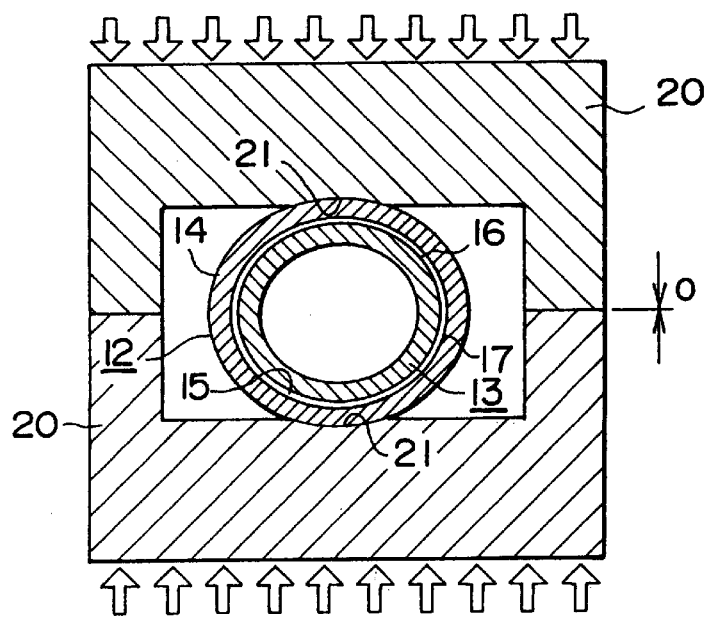
FIG. 16 is a cross-sectional view taken along in the same manner as FIG. 15 in a state after plastic deformation.
Figure 17:
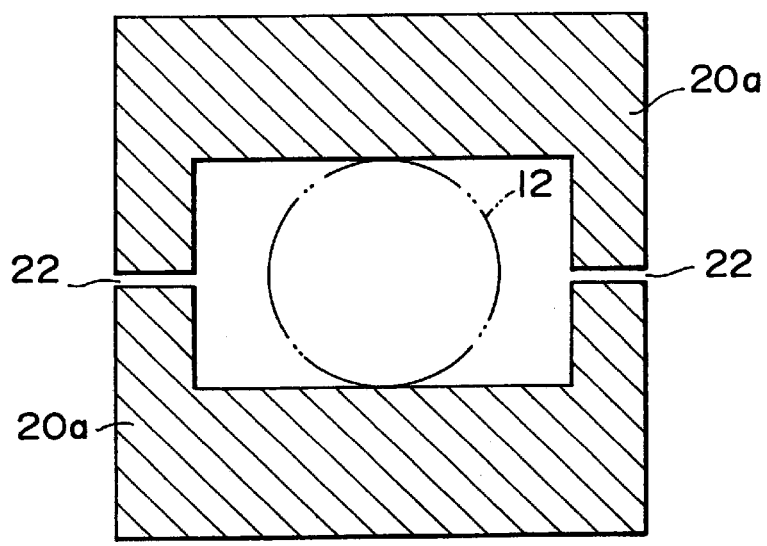
FIG. 17 is a cross-sectional view taken along in the same manner as FIG. 15, for showing a step of a second known method of manufacturing a shock absorbing type steering shaft.
Figure 18:
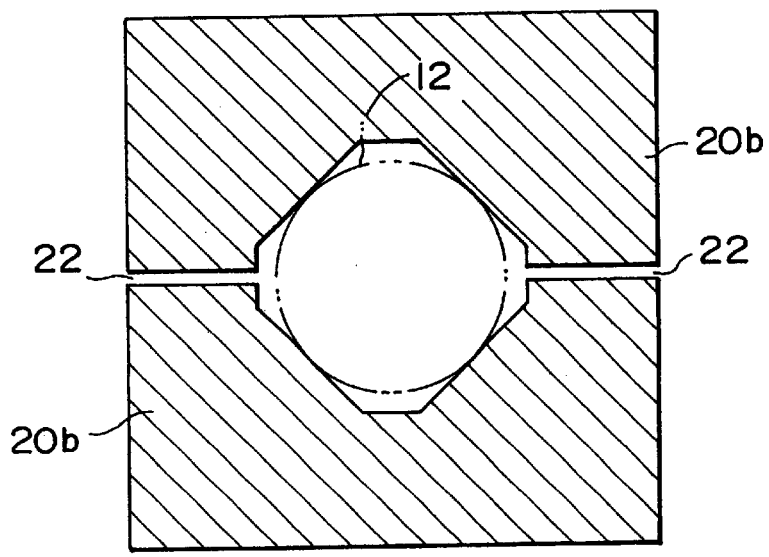
FIG. 18 is a cross-sectional view taken along in the same manner as FIG. 15, for showing a step of a third known method of manufacturing such steering shaft.
Figure 19:
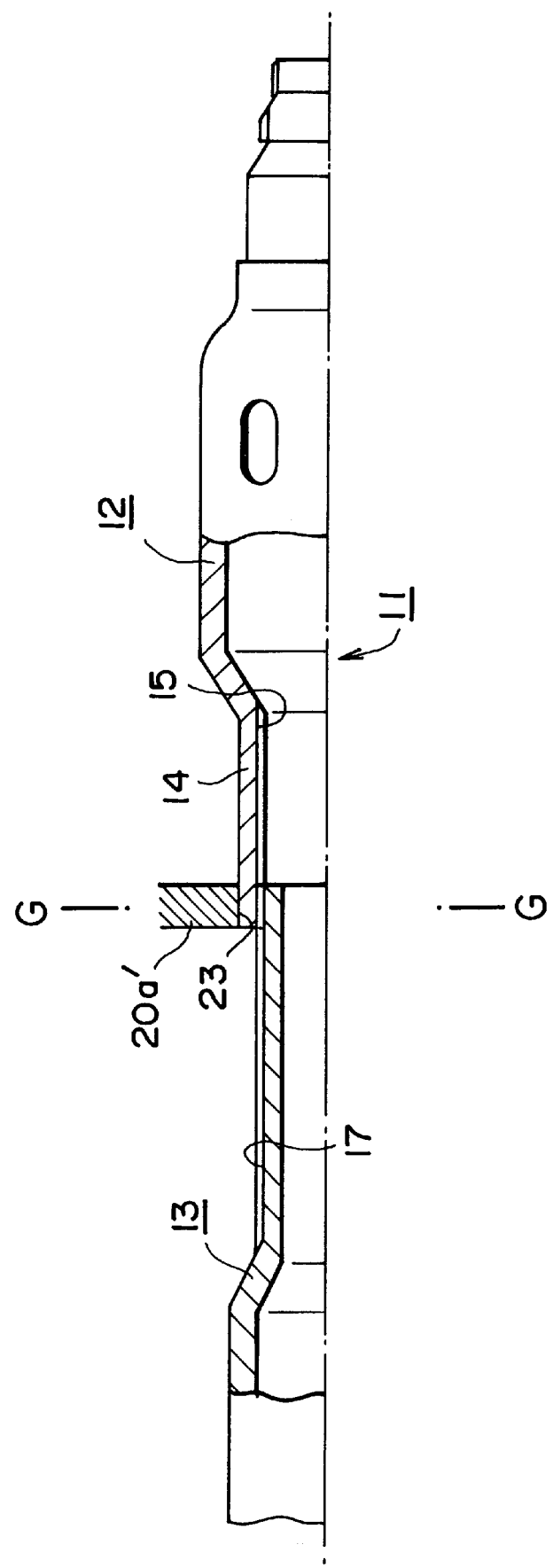
FIG. 19 is a partial cross-sectional view for showing a first-half step of an embodiment of the prior invention.
Figure 20:
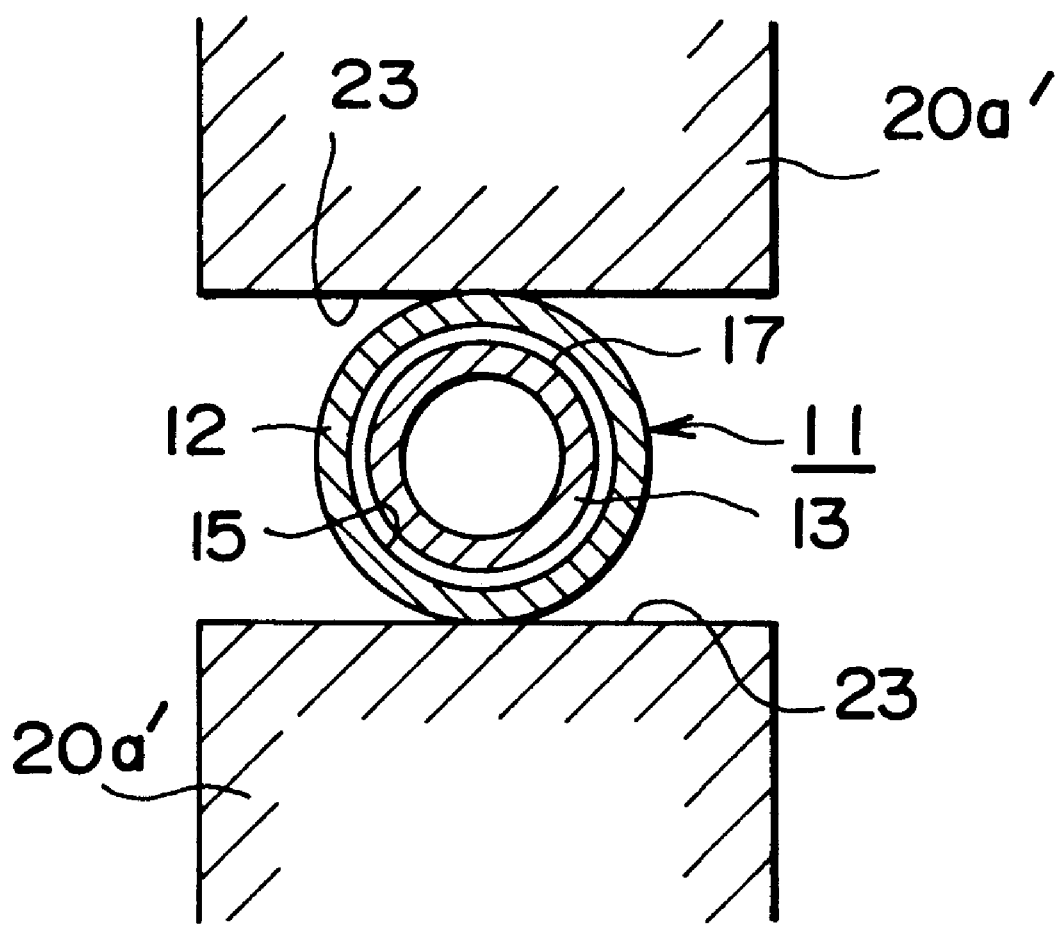
FIG. 20 is a cross-sectional view taken along the line G—G of FIG. 19.
Figure 22:
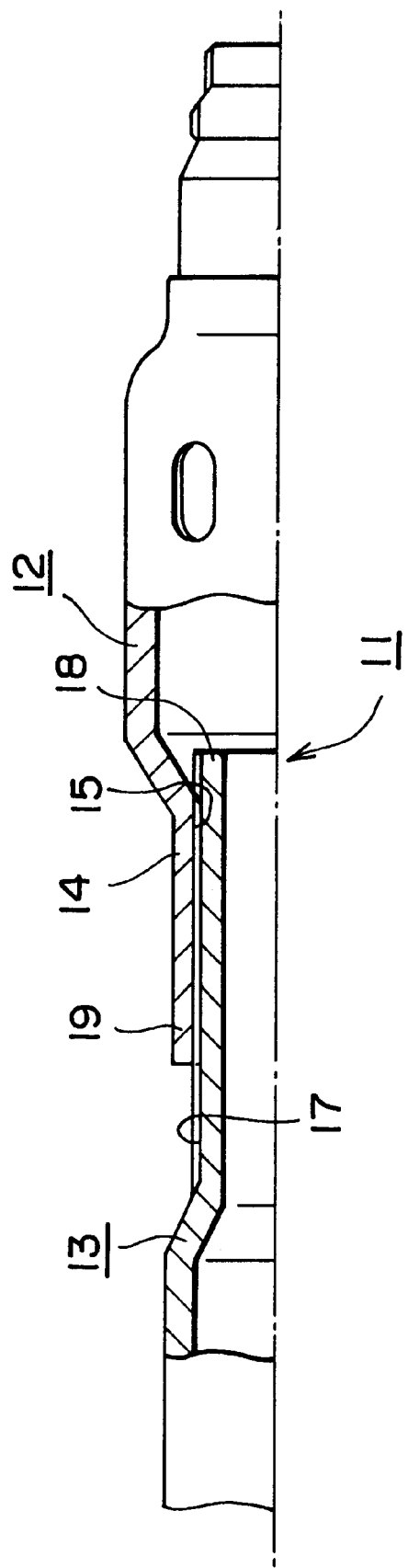
FIG. 22 is a partial cross-sectional view for showing the state in which a shaft has been contracted due to a collision accident.
Figure 23:
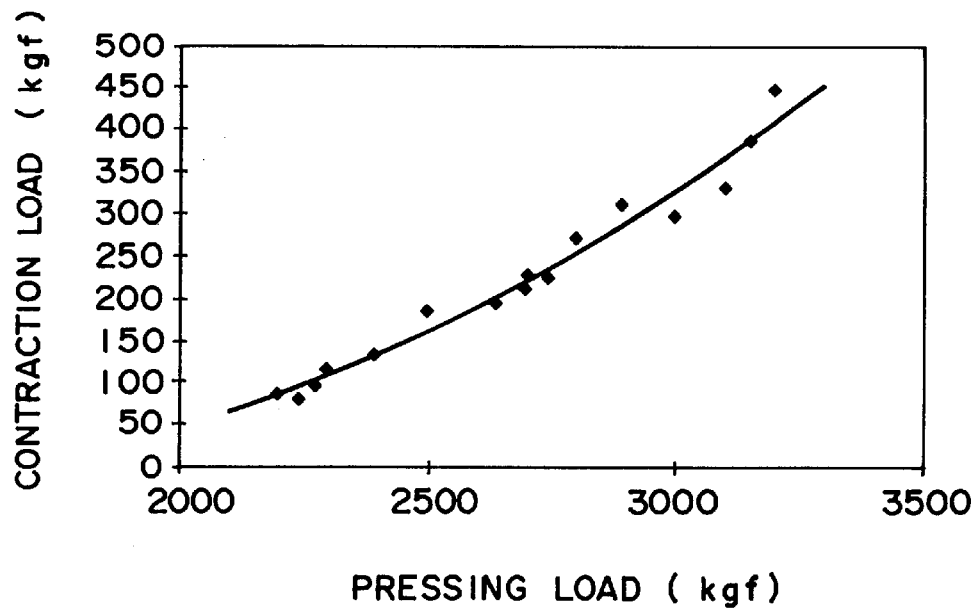
FIG. 23 is a graph for showing the relation between a pressing load and a contraction load when the contraction load is adjusted according to the method of the prior invention.
Figure 24:
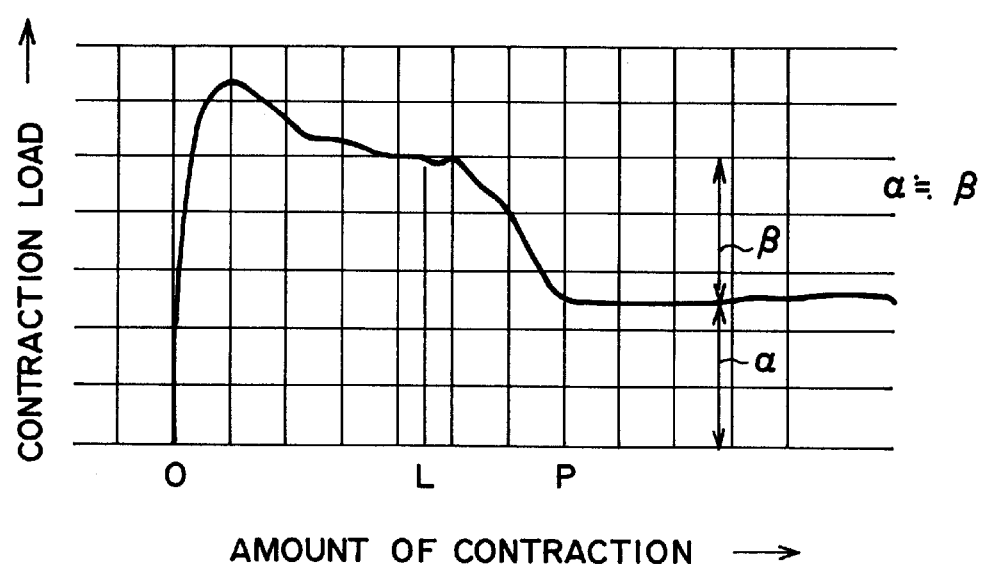
FIG. 24 is a graph for showing the relation between an amount of contraction and a contraction load of a shock absorbing type steering shaft which is manufactured by adjusting the contraction load according to the prior invention.
Figure 25:
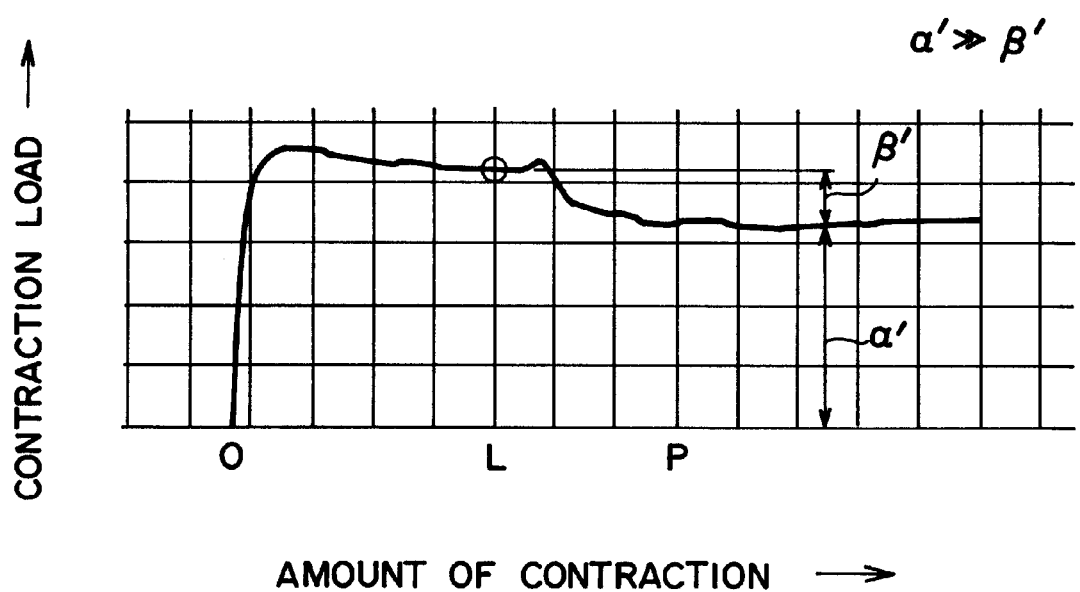
FIG. 25 is a graph for showing the relation between an amount of contraction and a contraction load of a shock absorbing type steering shaft which is manufactured by a method other than that of the prior invention.

In order to prepare such shock absorbing type steering shaft 11 of the present invention, in the same manner as that of the prior invention shown in FIGS. 19 and 20, the outer peripheral surface of the outer shaft 12 is pressed inwardly in the diametrical direction thereof by a pair of pressing pieces 20a' and 20a', which are displaced toward each other, in the state in which these both serrations 15 and 17 are engaged with each other. Then, the fore end portion of the outer shaft 12 and the rear end portion of the inner shaft 13 are pressed in the radial direction so that the cross sections of these both end portions are plastically deformed into the respective elliptical shapes, as shown in FIG. 16. Subsequently, the outer shaft 12 and the inner shaft 13 are pressed toward each other so that the fore end portion of the outer shaft 12 and the rear end portion of the inner shaft 13 are laid to overlap each other only by a desired length L in the axial direction, as shown in FIG. 1. Thus the both shafts 12 and 13 are tightly fitted to each other to be brought into pressure-fitted engagement at two locations that are apart from each other in the axial direction and into loose engagement at any part between these locations, as shown in FIG. 7. At a secondary collision, as shown in FIG. 22, a fitting length or overlapped length between the outer shaft 12 and the inner shaft 13 is larger than the above-mentioned normal fitted length L so that the total length of the shock absorbing type steering shaft is contracted.

In case of the shock absorbing type steering shaft 11 in the present embodiment, a film 24 made of solid lubricant (see FIG. 3) is formed along the total length L17 (L17>the desired length L) of the male serration 17 on the surface of the male serration 17 which is formed on one end portion of the inner shaft 13. The material and the thickness of the solid lubricant for forming this film 24 are selected in terms of the designing in accordance with a desired contraction load and bending rigidity. The material to be used must have excellent sealing performance onto the surface of the male serration 17. As such material, a molybdenum disulfide (MoS2) type lubricant which is available in market as a trade name "Drilube" manufactured by Toyo Drilube Co., Inc., or fluoroplastic such as PTFE, FEP may be used preferably.

It is required to secure a certain thickness of the film to prevent a friction between the metals for forming the outer shaft 12 and the inner shaft 13 respectively (normally steel or aluminum alloy). However, if the thickness of the film 24, which itself has a low rigidity, is too large, the bending rigidity between the outer shaft 12 and the inner shaft 13 which have the end portions fitted to each other with this film 24 therebetween becomes low. In considering these circumstances, the thickness of the film 24 is preferably regulated into a range from 0.005 to 0.015 mm when "Drilube" is used as the solid lubricant.

In case of the shock absorbing type steering shaft 11 constituted as described above, the female serration 15 which is formed on the inner peripheral surface at one end of the outer shaft 12 is brought into slidable contact with the male serration 17 which is formed on the outer peripheral surface at the end of the inner shaft 13 with the film 24 of solid lubricant therebetween. There is no chance, or little chance, if any, that the metals (steel or aluminum alloy) which respectively constitute the outer shaft 12 and the inner shaft 13 are brought into direct contact with each other. Consequently, the slidable contact state between the female serration 15 and the male serration 17 becomes stable and the contraction load of the shock absorbing type steering shaft 11 becomes stable. As a result, it is possible to design more easily a steering apparatus for an automobile which is arranged to include this shock absorbing type steering shaft 11. Particularly, when one of the outer shaft 12 and the inner shaft 13 is made of steel and the other is made of aluminum alloy to reduce the weight of the steering shaft, damages such as plucking or scoring may be easily brought about in this condition on the sliding surface between female serration 15 and the male serration 17. However, according to the present invention, these damages can be prevented even in such case so that the shock absorbing type steering shaft 11 can be contracted in a stable manner.

EXAMPLES

Figure 21:
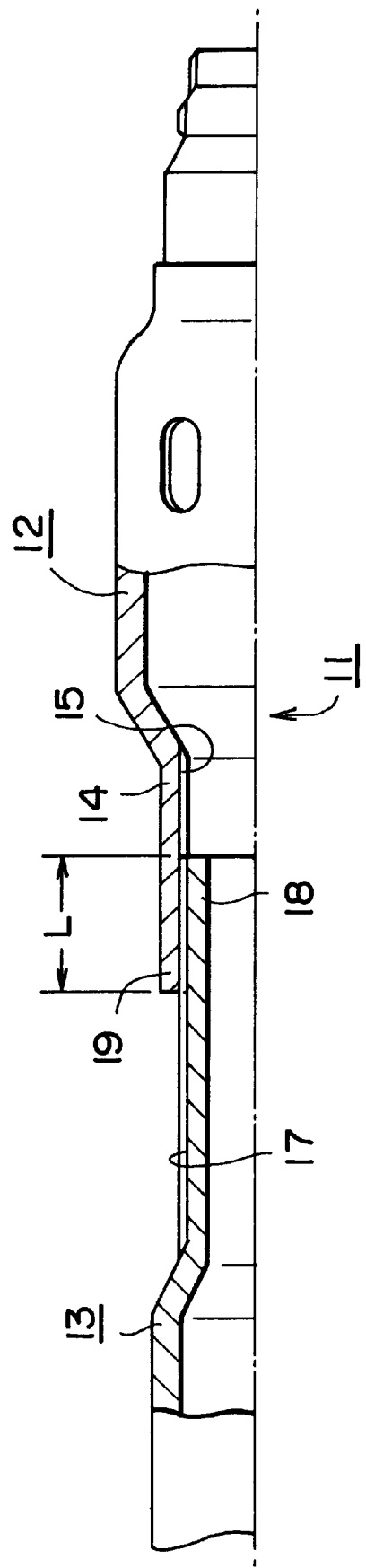
FIG. 21 is a partial cross-sectional view for showing a second-half step of the embodiment of the prior invention.

Results of experiments conducted to confirm the effect of the present invention will be described below. In the experiments, a shock absorbing type steering shaft 11 as shown in FIGS. 1 and 21 is prepared by the method according to the prior invention described with reference to FIGS. 19 to 21 to detect an influence of the presence or the absence of the film 24 which is made of solid lubricant on the surface of the male serration 17 on a contraction load of the shock absorbing type steering shaft. Both the outer shaft 12 and the inner shaft 13 are made of steel, and a targeted value for a load Pp for pressing the outer shaft 12 and the inner shaft 13 by means of the pair of pressing pieces 20a' and 20' (FIG. 20) is set at 3300 kgf. Since this pressing load unavoidably fluctuates to some extent, the load values that are actually applied are shown in Table 1. The desired length L by which the fore end portion of the outer shaft 12 and the rear end portion of the inner shaft 13 are laid to overlap each other in the axial direction is set at 60 mm. The conditions for the experiments are set to be the same as much as possible in all experiments except the presence or the absence of the film 24. Note that S-6150 (trade name) that is a fluoroplastic type "Drilube" is used as the solid lubricant for forming this film 24.

Figure 4:
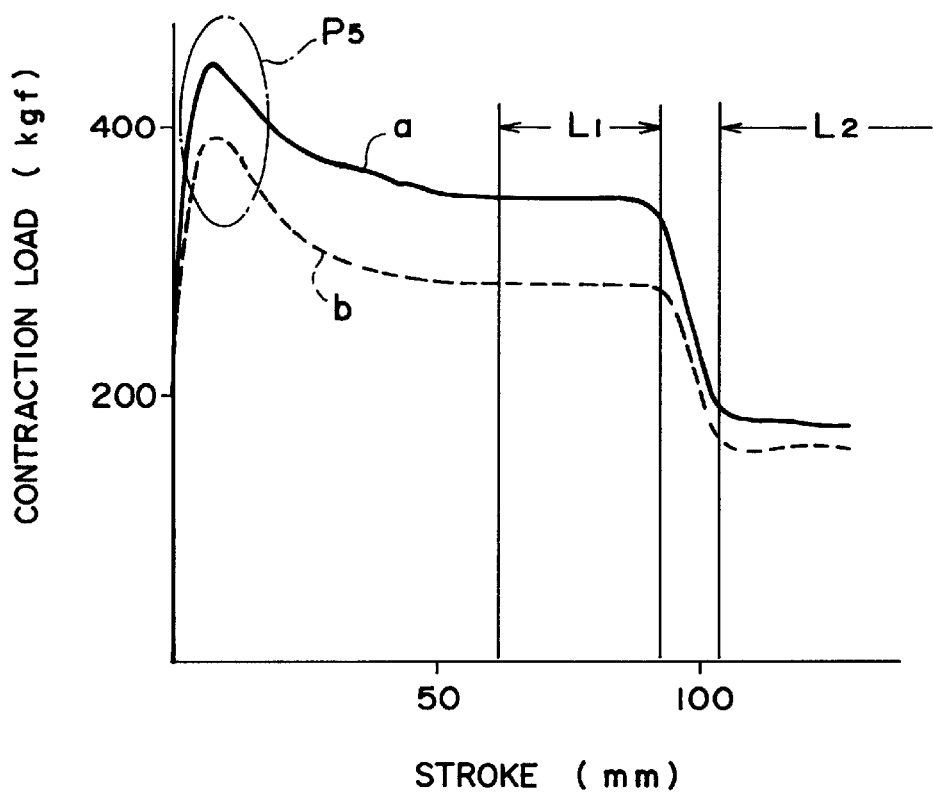
FIG. 4 is a graph for showing a result of experiments conducted to confirm the effect of the present invention.

Results of the experiments conducted under such conditions are shown in Tables 1 and 2 and FIG. 4. In Tables 1 and 2, the maximum load Ps for pressing indicates the maximum value for the load which is required when the outer shaft 12 and the inner shaft 13 respectively forming the first and second deformed portions 18 and 19 are brought toward each other to constitute the shock absorbing type steering shaft 11, as shown in FIG. 19, and corresponds to the peak value shown in the left end portion of FIG. 4. The contraction load P1 in the "outer+inner" column indicates a load which is required for contracting the shock absorbing type steering shaft 11 in the state in which both the first and second deformed portions 18 and 19 are in the pressure-fitted state (the range L1 in FIG. 4), as shown in FIGS. 1 and 21. Further, the contraction load P2 of the "inner only" column indicates a load which is required for contracting the shock absorbing type steering shaft 11 in the state in which the first deformed portion 18 is taken out from the pressure-fitted state and only the second deformed portion 19 and the inner shaft 13 are pressure-fitted to each other (the range L2 in FIG. 4), as shown in FIG. 22. In FIG. 4, the solid line a indicates a relation between a contraction load and an amount of contraction (stroke) in case the film 24 is not provided, and the broken line b indicates a relation between a contraction load and an amount of contraction in case the film is provided, represented by the respective average values thereof.

TABLE 1

(kgf)

| | Sample No | Pressing load $P_P$ | Maximum load at pressing $P_S$ | Contraction load Outer + inner $P_1$ | Inner only $P_2$ |
|---|---|---|---|---|---|
| Film absent | 1 | 3315 | 486 | 345 | 160 |
| | 2 | 3315 | 446 | 348 | 182 |
| | 3 | 3305 | 442 | 328 | 166 |
| | 4 | 3305 | 420 | 314 | 158 |
| | 5 | 3305 | 442 | 330 | 170 |
| Film present | 6 | 3340 | 388 | 274 | 150 |
| | 7 | 3320 | 364 | 266 | 152 |
| | 8 | 3320 | 380 | 274 | 150 |
| | 9 | 3310 | 362 | 268 | 158 |
| | 10 | 3340 | 390 | 280 | 158 |

TABLE 2

Estimated fluctuation by F(t) value (kgf)

| | Sample No. 1 to 5 (Average $P_p$ =3309 kgf) | | | Sample No. 6 to 10 (Average C = 3326 kgf) | | |
|---|---|---|---|---|---|---|
| | $P_S$ | $P_1$ | $P_2$ | $P_S$ | $P_1$ | $P_2$ |
| F(t) 5% value | 388 | 300 | 145 | 345 | 259 | 143 |
| F(t) 95% value | 489 | 355 | 183 | 399 | 281 | 161 |
| Range R | 101 | 55 | 38 | 54 | 22 | 18 |

As clearly seen from Tables 1 and 2 and FIG. 4 showing the results of the experiments, according to the present invention, it is possible to obtain a reduced and stabilized contraction load for the shock absorbing type steering shaft 11. The point of this invention lies in that the contraction load can be stabilized. The magnitude of the contraction load can be freely adjusted by varying a load for pressing the outer shaft 12 and the inner shaft 13 by means of the pair of pressing pieces 20a' and 20a'. More specifically, if this load for pressing is increased, the contraction load can be increased. On the other hand, if this pressing load is decreased, the contraction load can be decreased. Accordingly, if the contraction load can be stabilized as mentioned above, the contraction load of the shock absorbing type steering shaft 11 can be set near the targeted value.

Figure 5:
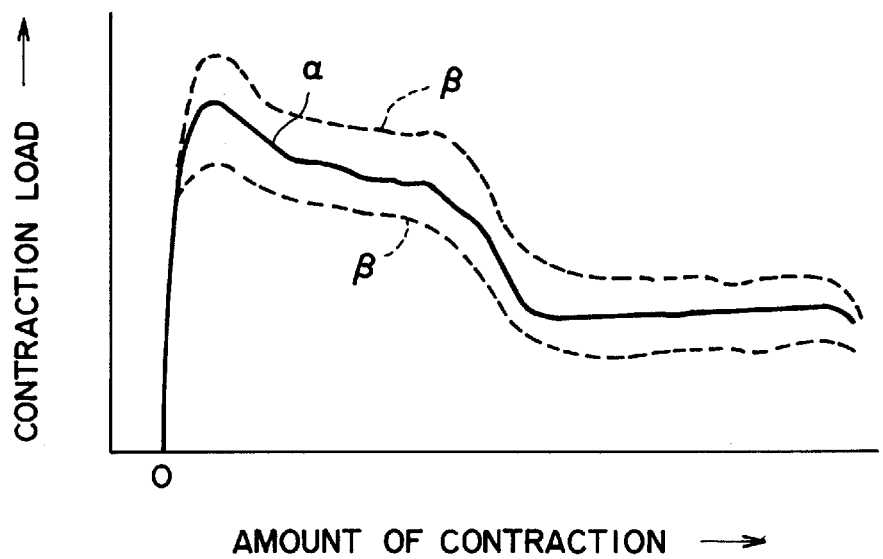
FIG. 5 is a graph for illustrating a setting of a relation between a contraction load and an amount of contraction.

That is, for designing a steering apparatus for an automobile capable of satisfactorily protecting the driver, a relation between a contraction load and an amount of contraction of a shock absorbing type steering shaft 11 to be incorporated in this steering apparatus is regulated as indicated by the solid line α in FIG. 5. However, since it is difficult to regulate this relation exactly as indicated as the solid line α, the relation is regulated into a range between two broken lines β, β in the same figure. The narrower the gap between these two broken lines β, β is, the smaller a fluctuation in the relation between the contraction load and the amount of contraction of the shock absorbing type steering shaft 11 becomes. Thus, it becomes easier to design the steering apparatus for an automobile. According to the present invention, it is possible to reduce the fluctuation in the relation between the contraction load and the amount of contraction of the shock absorbing type steering shaft 11 by reducing the gap between the two broken lines β, β.

Note that if the film 24 of solid lubricant is formed on the surface of the female serration 15, instead of the surface of the male serration 17, or on the surfaces of both the male and female serrations 17 and 15, the same operation and effect can be obtained. When the film 24 is formed on the surfaces of both the male and female serrations 17 and 15, the total thickness of the film 24 is set within the above range. When one or both of the outer shaft 12 and the inner shaft 13 are made of nonferrous metals such as aluminum alloy, the film 24 is formed on the surface of the serration which is formed on the nonferrous metal shaft, or on the surfaces of the both serrations.

Since constituted and operated as described above, the shock absorbing type steering apparatus of the present invention contributes to realize a steering apparatus which can effectively protect the driver at a secondary collision. In addition, since the film made of solid lubricant may be thin, the bending rigidity of the connection between the outer and inner shafts is not reduced to cause a substantial problem for practical use. Further, even when the shock absorbing type steering apparatus is formed by combining steel and aluminum alloy as in the above examples, it is possible to prevent damages such as plucking or scoring to contract the shock absorbing type steering shaft in a stable manner.

What is claimed is:

1. A shock absorbing type steering apparatus comprising, in combination, a tubular outer shaft with a female serration on an inner peripheral surface at one end portion thereof and an inner shaft with a male serration engaged with said female serration on an outer peripheral surface at one end portion thereof, said male serration and said female serration being in a state of interference-fitted engagement with each other at portions of substantially elliptical cross-sectional shape so as to be contractable in response to a load in an axial direction, a film of solid lubricant being formed on a surface of at least one of said male and female serrations, said film of solid lubricant occupying a portion of said one serration in said state of interference-fitted engagement and extending axially therefrom along a non-engaged portion such that, during contraction, said other serration comes into engagement with and slides along said non-engaged portion through said film of solid lubricant on said non-engaged portion, and wherein said one end portion of the outer shaft and said one end portion of the inner shaft are pressure-fitted to each other through said film of solid lubricant without any gap at first and second fitting portions spaced apart in the axial direction, and in loose engagement between the first and second pressure-fitted portions.

2. A shock absorbing type steering apparatus according to claim 1, wherein said solid lubricant film is formed on a surface of said male serration.

3. A shock absorbing type steering apparatus according to claim 2, wherein a material of said solid lubricant film is selected from molybdenum disulfide type or fluoroplastic type materials.

4. A shock absorbing type steering apparatus according to claim 1, wherein a thickness of said film of solid lubricant is from about 0.005 mm to about 0.015 mm.

5. A shock absorbing type steering apparatus according to claim 1, wherein a material of said film is selected from molybdenum disulfide type or fluoroplastic type materials.

6. A shock absorbing steering apparatus, comprising, in combination:

a tubular outer shaft formed with a female serration on an inner peripheral surface toward an end of said outer shaft;

an inner shaft formed with a male serration on an outer peripheral surface toward an end of said inner shaft; and a film of solid lubricant formed on a surface of at least one of said male serration and said female serration over a first length in an axial direction;

wherein an end portion of said female serration and an end portion of said male serration are in interference-fitted engagement with each other through said film without any gap at axially spaced, pressure-fitted portions of substantially elliptical cross-section and over a total length (L) in the axial direction which is smaller than said first length; and wherein, upon a secondary collision, said steering apparatus is contracted in length so that said end portion of said female serration comes into interference-fitted engagement through said film with another portion of said male serration, and said end portion of said male serration comes into interference-fitted engagement through said film with another portion of said female serration.

7. A shock absorbing type steering apparatus according to claim 6, wherein said film of solid lubricant is formed over an entire length of said at least one serration.

8. A shock absorbing type steering apparatus according to claim 7, wherein a material of said film is selected from molybdenum disulfide type or fluoroplastic type materials.

9. A shock absorbing type steering apparatus according to claim 6, wherein a thickness of said film of solid lubricant is from about 0.005 mm to about 0.015 mm.

10. A shock absorbing type steering apparatus according to claim 6, wherein said solid lubricant film is formed on a surface of said male serration.

11. A shock absorbing type steering apparatus according to claim 6, wherein a material of said solid lubricant film is selected from molybdenum disulfide type or fluoroplastic type materials.

* * * * *